May 30, 1961    C. L. LAMB    2,986,190
TRACTION DEVICES FOR AUTOMOTIVE VEHICLES
Filed Aug. 3, 1959    2 Sheets-Sheet 1
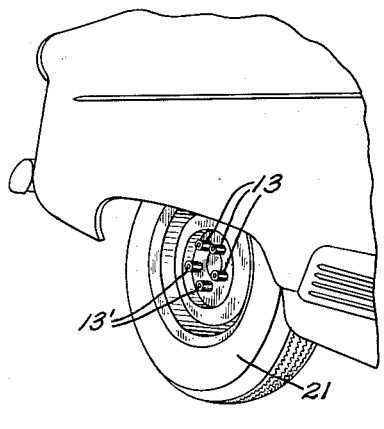
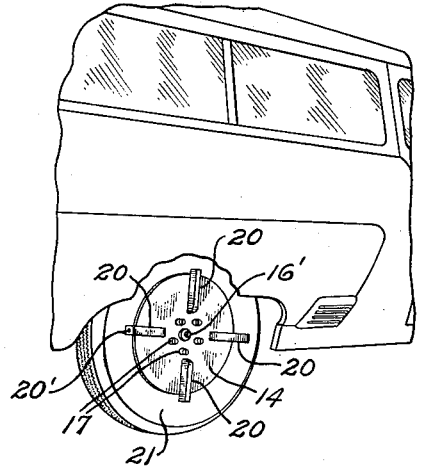
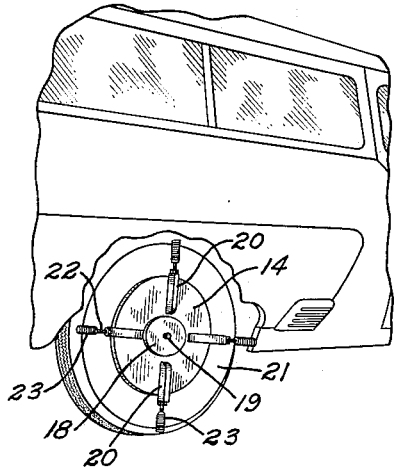
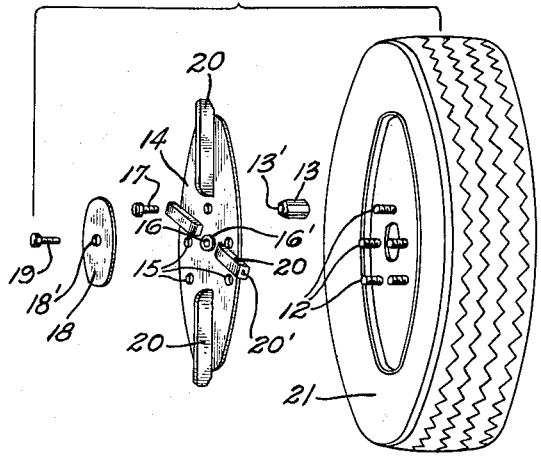
INVENTOR.
Carroll L. Lamb,
BY Morsell & Morsell
ATTORNEYS.

May 30, 1961 C. L. LAMB 2,986,190
TRACTION DEVICES FOR AUTOMOTIVE VEHICLES
Filed Aug. 3, 1959 2 Sheets-Sheet 2
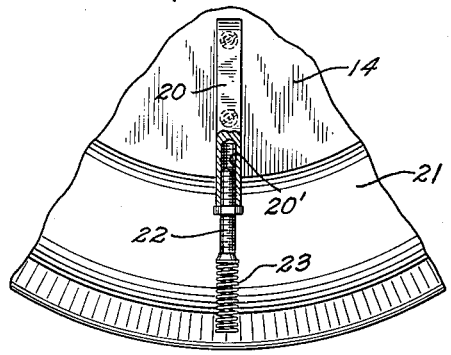
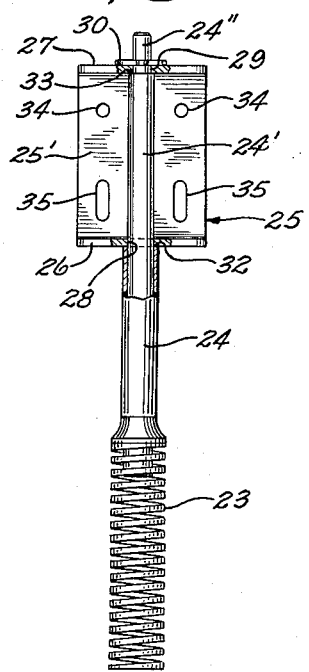
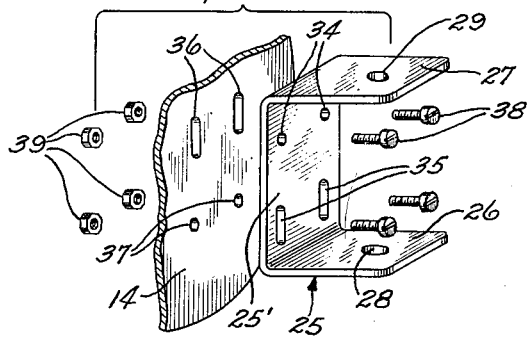
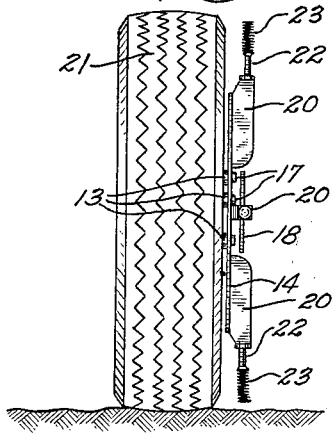
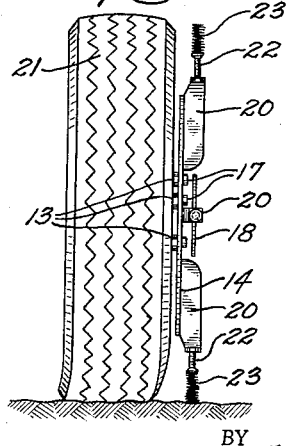
INVENTOR.
Carroll L. Lamb,
BY
Morsell & Morsell
ATTORNEYS.

United States Patent Office

2,986,190
Patented May 30, 1961

2,986,190

TRACTION DEVICES FOR AUTOMOTIVE VEHICLES

Carroll L. Lamb, 1911 Arcturus Ave., Racine, Wis.

Filed Aug. 3, 1959, Ser. No. 831,241

3 Claims. (Cl. 152—216)

This invention relates to improvements in traction devices for automotive vehicles, and more particularly to a traction device which can be removably mounted on the wheels of a vehicle for driving on snow and ice.

Tire chains are presently used on many vehicles during the winter months to increase the traction of the wheels when driving on snow-covered streets. It is well known, however, that chains have certain shortcomings and are not entirely satisfactory. Not only are they difficult to attach to the wheels, but it has been found that chains are relatively ineffective on solid ice and packed snow, and do not provide adequate traction on such surfaces. Moreover, each time the snow thaws or is cleared from the streets the chains have to be laboriously removed and stored inasmuch as they are not only noisy but are liable to injure the tires when used on dry pavement.

In order to overcome these and other objections to tire chains, various other traction devices have been designed. These devices have all had certain objectionable features, however, and none has been commercially successful. One such device having several advantages utilized elongated, rigid spikes or gripping arms which were fastened to a face of the vehicle wheel and projected radially outwardly beyond the periphery of the wheel to engage the surface of the road. This type of device had excellent gripping qualities and provided effective traction under even the most difficult driving conditions. Unfortunately, however, it was found that the rigid arms dug into and damaged the pavement and, in addition, were frequently broken off or bent by obstacles in the roadway such as stones or railway tracks. Moreover, the gripping members used in this type of traction device were either permanently attached to the wheel and could not be removed when not in use, or they were mounted on the wheel in such a manner that their removal was extremely difficult.

With the above in mind, therefore, the general objects of the present invention are to provide a traction device of the general type employing radially projecting gripping arms, but wherein said projecting arm members will not deface the streets, wherein said arms are not easily broken or deformed by obstacles in the road, and wherein said gripping arms can be attached to or removed from a vehicle quickly and easily, and without special tools or equipment.

A more specific object of the present invention is to provide a traction device of the type described wherein the radially projecting gripping arms are somewhat flexible, rather than absolutely rigid, said arms being formed of elongated springs which are rigid enough to provide ample traction but which are sufficiently yieldable to prevent their digging into and damaging the pavement or being broken or bent by objects in the road.

A further specific object is to provide a traction device of the type described wherein the radially projecting gripping arms can be manually adjusted to project outwardly a greater or lesser distance depending upon the surface condition of the streets.

A further object is to provide a traction device of the type described wherein the gripping arms are detachable and can be easily removed from the rest of the unit for storage in the glove compartment or trunk when the streets are temporarily clear of snow and ice, said arms being adapted to be quickly re-installed in the event of a snowstorm. After the winter season, or when it is apparent that the unfavorable driving conditions have passed, the entire unit can be removed from the wheels, although with the gripping arm detached the device has a unique and attractive appearance and may be left on the vehicle the year around, if desired.

Still further objects of the present invention are to provide a traction device for winter driving which is designed to prevent a vehicle from becoming mired in deep snow and to minimize the danger of skidding on ice, which device is simple and relatively inexpensive in construction, and which device is unusually well adapted for its intended purposes.

With the above and other objects in view, the invention consists of the improved traction device for automotive vehicles, and all of its parts and combinations, as set forth in the claims, and all equivalents thereof.

In the drawings accompanying and forming a part of this specification, wherein is shown one complete embodiment of the preferred form of the invention and a modification thereof, and wherein like reference characters indicate the same parts in all of the views:

Fig. 1 is a perspective view of the rear wheel of a vehicle before the traction device is mounted thereon, showing the elongated lug attachments employed in the invention;

Fig. 2 is a perspective view of a wheel having a part of the traction device mounted thereon;

Fig. 3 is a perspective view of a wheel having the complete traction device mounted thereon;

Fig. 4 is an exploded perspective view of the disc and disc-mounting assemblage forming a part of the invention;

Fig. 5 is a fragmentary side elevational view of the traction device mounted on a wheel, with a part thereof being broken away and shown in section;

Fig. 6 is an elevational view, partly in section, of a modified form of the gripping arm employed in the present invention;

Fig. 7 is an exploded perspective view showing the gripping member supporting bracket and a portion of the disc employed in the modified form of the invention illustrated in Fig. 6;

Fig. 8 is a front elevational view of a wheel and attached traction device in normal position; and Fig. 9 is an elevational view similar to Fig. 8 but showing the respective positions of the wheel and gripping members when the vehicle is in a sideways skidding situation.

Referring now more particularly to the drawings, it will be seen that the traction device comprising the present invention includes a disc 14 which is designed to fit within the tire 21 adjacent the wheel rim of an automobile or other vehicle. Said disc has a plurality of spaced apertures 15 (Fig. 4), adapted to be aligned with the lugs 12 on the wheel drum, and said disc has a central opening 16 with an internally threaded collar 16' formed thereabout. A plurality of radially disposed bars 20 are attached to the outer face of the disc, each of said bars having a threaded longitudinal opening 20' in its outer end. As will be hereinafter seen, said bars are designed to removably retain the gripping arms employed in the principal form of the invention illustrated in Figs. 1 through 5.

To secure the disc 14 to a wheel, the hub cap is first removed and the conventional nuts are withdrawn from the wheel lugs 12 and replaced with elongated nuts 13 having threaded longitudinal openings 13' therethrough (Fig. 4). The disc is then positioned with its apertures 15 in alignment with said nuts and a bolt 17 is projected through each aperture and threaded into the end of the adjacent nut. A smaller, concentric plate 18 (Figs. 3 and 4), having a central hole 18', is secured to the outer face of the disc 14 by a bolt 19 projected through said central hole and threaded into the aforementioned central opening 16 in the disc, said plate abutting the collar 16'. The plate 18 is designed to maintain the retaining bolts 17 in place, preventing their working out while the car is in motion, and said plate also enhances the appearance of the unit.

The attractive appearance of the assemblage is an important element of the invention and one of the features distinguishing the present device from the prior traction devices of this general type. Formed of stainless steel or similar metal having superior corrosion-resisting properties and adapted to take a high polish, the unit has an appearance not unlike an enlarged, custom hub cap. Moreover, the raised, radially disposed bars 20 on the face of the disc create a unique three-dimensional visual effect when the vehicle is moving. For this reason, it is believed that many people will prefer to leave the unit mounted on their automobiles the year around, removing and storing only the projecting gripping arms, which operation will be hereinafter described, after the winter season.

The gripping arms employed in the principal form of the invention are illustrated in Figs. 3 and 5, and although four such arms are usually mounted on a disc, it is to be understood that the number of arms employed is not critical. Each gripping arm comprises a threaded shank 22 adapted to be screwed into the outer end of one of the bars 20, and an elongated coil spring 23 permanently secured to and projecting longitudinally outwardly from the end of the shank. Said springs are preferably formed of strong spring steel, although springs formed of plastic or other materials might perform satisfactorily. It is contemplated also that a device other than a spring might be employed, such as a flexible bar or rod, and it is not intended to limit the invention to the specific form illustrated. The important characteristic of the gripping members in the present invention is that they are somewhat flexible, rather than absolutely rigid.

Heretofore, rigid metal or wooden spikes have been used in traction devices of this type and, as mentioned above, the inflexible nature of such gripping members frequently caused considerable damage to both the pavement and the spikes themselves. In the present invention, however, while the elongated coil springs 23 are rigid enough to dig into ice or packed snow to provide increased traction for the wheels, said springs are sufficiently yieldable to prevent their digging into and damaging the pavement or being broken or bent by obstacles in the road. Ordinarily a pair of the traction units herein described is mounted on a vehicle, one on each of the rear, or driving, wheels. It is possible, however, to mount a unit on only one of the driving wheels, or to mount one of the units on each of the four wheels, and the particular number of traction members is not critical to the invention. It is to be understood, too, that while the present traction device is primarily intended for driving in snow, to eliminate the possibility of the vehicle becoming mired and to prevent skidding, the device might also be used to advantage in desert regions, or other sandy or muddy areas where the ground is insecure and the traction unsure.

In addition to the foregoing uses and advantages, the present invention is also characterized, of course, by the ease with which it can be mounted on a vehicle. The mounting and dismounting of the discs 14 is a relatively simple operation and can be performed by the average automobile owner without any special tools or equipment. Ordinarily the discs will be mounted on a vehicle in late fall or early winter and removed at the end of the winter although, as mentioned, some owners will undoubtedly prefer to leave the discs on their cars the year around. During the winter months there will be many times, of course, when added traction is not needed and in those instances the removable gripping arms may be unscrewed from the discs and conveniently stored in the glove compartment or trunk of the car. In the event of a snow storm or the like the gripping arms can be re-installed in a matter of seconds, that operation being so simple and effortless that it can be easily accomplished by a woman. As will be readily appreciated, the result is a traction device for automobiles and other vehicles wherein there is no necessity for laboriously disassembling and removing the entire device each time the snow thaws or is cleared from the streets.

Another feature of the present invention is that the length of the gripping arms can be manually adjusted to correspond with the depth of the snow or condition of the roads. As described, the arm shanks 22 are designed to be threaded into the longitudinal openings 20' in the radial bars 20 (Fig. 5), and the outwardly projecting portion of said arms can be lengthened or shortened with precision by merely screwing the shanks further into or out of said bar openings. It has been found that very satisfactory results are obtained under normal winter driving conditions when the gripping arms are so mounted that their outer ends are spaced slightly above the surface of the road, rather than in actual contact with the same, as illustrated in Fig. 8. This arrangement avoids needless wear and tear on the springs and also eliminates the noise which otherwise occurs every time one of the rotating spring arms contacts the road surface. Moreover, the spacing of the springs from the ground does not materially affect the skid-preventive qualities of the traction device. As shown in Fig. 9, when a vehicle is in a skidding situation the tires tend to bend under somewhat, with the result that the gripping arms are brought into engagement with the surface and the skidding movement checked. It is to be understood, however, that while the latter arrangement is preferred under most conditions, the invention is not to be confined to any particular setting or arrangement of the gripping arms.

In the modified form of the invention shown in Figs. 6 and 7, the rigid, radial bars 20 are replaced on the disc by adjustable brackets 25 which are adapted to removably retain the gripping arms. Said brackets comprise a flat base 25' having end portions 26 and 27 bent perpendicularly thereto. The base 25' has a pair of horizontally aligned circular openings 34 therethrough, and a pair of horizontally aligned slotted openings 35 spaced therebelow, and the disc 14 is provided with aligned, similarly-shaped but oppositely disposed openings 36 and 37. The bracket is secured to the disc by means of bolts 38 projected through said aligned openings and held in clamping relation by nuts 39 threaded thereon and abutting the back of the disc. As will be readily appreciated, said brackets can be adjusted radially on the disc, within certain limits, by loosening the bolts 38 and sliding the bracket upwardly or downwardly thereon, such sliding movement being permitted by the slotted nature of the opposite disc and bracket openings 36 and 35. This feature allows the simple longitudinal adjustment and setting of the gripping arms to correspond with the existing driving conditions.

The transverse end portion 26 of each bracket 25 has an aperture 28 therethrough, and the opposite end portion 27 has a smaller, aligned aperture 29, said apertures being adapted to receive spaced portions of the shank 24 forming part of the gripping arm employed in the modified form of the invention. Said shank 24 is smooth, as distinguished from the threaded shank 22 utilized in the form of the invention shown in Figs. 1 through 5, and has an intermediate portion 24' having a smaller diameter than the shank proper and a radial inner end portion 24" having a still smaller diameter. The offset design of said shank 24 permits the projection of the shank through the apertures 28 and 29 and provides shoulders 32 and 33 which abut the bracket end members 26 and 27, respectively, when the gripping arm is mounted on said bracket. Permanently secured to the outer end of the shank is a coil spring 23 which is similar in function and construction to the spring used in the principal form of the invention. When the shank is mounted in the bracket as described, a retaining clip 30 (Fig. 6) is fastened to the inner projecting end 24" of the shank to removably lock the gripping arm in position.

The shoulders 32 and 33 formed by the offset design of the gripping arm shank, as described, serve a twofold purpose. First, said shoulders uniformly fix the distance the gripping arms can be inserted into the bracket apertures, thereby insuring that all of the arms project radially outwardly the same distance and, secondly, said shoulders serve to distribute the stresses encountered by the gripping arms evenly between the two bracket end portions 26 and 27, thus minimizing the possibility of the supporting brackets being broken or deformed by such forces. The principal advantage of the modified construction illustrated in Figs. 6 and 7 is, of course, in its simplicity and the relative economy with which it can be manufactured.

As will be readily appreciated from the foregoing description, both the principal form of the present invention and the modified version illustrated in Figs. 6 and 7 provide a traction device which is invaluable for winter driving. In addition to preventing a vehicle from becoming mired in deep snow, the device also minimizes the possibility of skidding and is a definite safety aid. Moreover, the projecting gripping arms employed in the invention will not deface the streets, said gripping arms are not easily broken or bent by obstacles in the road, and said arms can be attached to or removed from the vehicle easily and without special tools or equipment.

It is to be understood that the improved traction device comprising the present invention is not to be limited or confined to the exact structural details shown and described herein. Various modifications of the individual members may suggest themselves to persons skilled in the art, and all of such changes or modifications are contemplated which do not depart from the spirit of the invention and which may come within the scope of the following claims.

What I claim is:

1. A removable traction device for an automotive vehicle wheel comprising: a disc removably mounted on the outer face of the wheel; and a plurality of flexible, radially-disposed gripping arms removably and longitudinally-adjustably secured to the outer face of said disc, said gripping arms having outer end portions formed of elongated springs, and said gripping arms projecting beyond the periphery of the disc and being adapted to engage the surface of the road.

2. A removable traction device for an automotive vehicle wheel having an outer face, with transverse lugs thereon, comprising: a plurality of elongated nut attachments threaded onto the wheel lugs, said nut attachments having threaded openings in their outer ends; a disc adjacent the outer face of the wheel, said disc having a plurality of apertures aligned with the nut attachments; a plurality of bolts projected through said apertures and threaded into the outer ends of said nut attachments to removably secure the disc thereto; a plurality of radially-projecting bars on the outer face of the disc, said bars having threaded longitudinal openings in their radial outer ends; and a plurality of gripping arms removably mounted in and projecting longitudinally outwardly from said bars, each of said arms comprising a threaded shank which is screwed into the bar end opening, and an elongated, flexible member rigidly secured to the radial outer end of the shank, said flexible member projecting beyond the periphery of the disc and being adapted to engage the surface of the road.

3. A removable traction device for an automotive vehicle wheel having an outer face with transverse lugs thereon, comprising: a plurality of elongated nut attachments threaded onto the wheel lugs, said nut attachments having threaded openings in their outer ends; a disc adjacent the outer face of the wheel, said disc having a plurality of apertures aligned with the nut attachments; a plurality of bolts projected through said apertures and threaded into the outer ends of said nut attachments to removably secure the disc thereon; a smaller, concentric plate removably attached to the outer face of said disc in covering relation to said bolts; a plurality of radially-projecting bars on the outer face of the disc, said bars having threaded longitudinal openings in their radial outer ends; and a plurality of gripping arms removably and longitudinally-adjustably mounted in and projecting longitudinally outwardly from said bars, each of said arm members comprising a threaded shank which is screwed into the bar end opening and an elongated, flexible coil spring rigidly secured to the radial outer end of the shank, said spring member projecting beyond the periphery of the disc and being adapted to engage the surface of the road.

References Cited in the file of this patent

UNITED STATES PATENTS

| | | |
|---|---|---|
| 619,821 | Bray | Feb. 21, 1899 |
| 1,352,752 | Jacobs | Sept. 14, 1920 |
| 2,460,023 | McGuiness | Jan. 25, 1949 |
| 2,494,850 | Williams | Jan. 17, 1950 |
| 2,754,874 | Gardner | July 17, 1956 |